(12) United States Patent
Stiner et al.

(10) Patent No.: US 6,267,311 B1
(45) Date of Patent: *Jul. 31, 2001

(54) TRIGGER FOR ACTUATING A BAIL ASSEMBLY

(75) Inventors: Roy Stiner; Young J. Kang, both of Tulsa, OK (US)

(73) Assignee: Brunswick Corporation, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/545,940

(22) Filed: Apr. 10, 2000

Related U.S. Application Data

(62) Division of application No. 09/189,684, filed on Nov. 10, 1998, now Pat. No. 6,056,221.

(51) Int. Cl.[7] ................................................. A01K 89/01
(52) U.S. Cl. ............................................................. 242/233
(58) Field of Search .................................... 242/233, 232, 242/231, 311, 310; D22/140, 141; 74/545

(56) References Cited

U.S. PATENT DOCUMENTS

| | | | |
|---|---|---|---|
| 4,382,562 | * 5/1983 | Neufeld | 242/311 |
| 4,830,306 | * 5/1989 | Tsunoda et al. | 242/316 |
| 4,921,188 | * 5/1990 | Smith | 242/233 |
| 5,004,182 | * 4/1991 | Councilman | 242/232 |
| 5,096,137 | * 3/1992 | Carlsson et al. | 242/223 |
| 5,098,031 | * 3/1992 | Hitomi | 242/233 |
| 5,154,369 | * 10/1992 | Smith | 242/233 |
| 5,595,352 | * 1/1997 | Oh | 242/233 |
| 5,620,149 | * 4/1997 | Zurcher et al. | 242/233 |
| 5,662,283 | * 9/1997 | Puryear et al. | 242/233 |
| 5,797,554 | * 8/1998 | Atherton et al. | 242/316 |
| 5,865,388 | * 2/1999 | Yeh | 242/316 |
| 6,056,220 | * 5/2000 | Cockerham et al. | 242/233 |
| 6,056,221 | * 5/2000 | Stiner | 242/311 |
| 6,070,822 | * 6/2000 | Zwayer et al. | 242/310 |
| 6,082,649 | * 7/2000 | Smith et al. | 242/233 |

* cited by examiner

Primary Examiner—Emmanuel M. Marcels
(74) Attorney, Agent, or Firm—Wood, Phillips, VanSanten, Clark & Mortimer

(57) ABSTRACT

A rotor assembly for a fishing reel, which rotor assembly includes a rotor having a first rotational axis, a bail assembly that is repositionable relative to the rotor between cast and retrieve positions, and a trigger that is movable relative to the rotor around a second axis between normal and actuated positions. The bail assembly is movable from the retrieve position towards the cast position as an incident of the trigger moving from the normal position to the actuated position. The trigger has a forwardly projecting leg. A gripping portion is applied to the forwardly projecting leg to facilitate engagement of the forwardly projecting leg by a user.

20 Claims, 8 Drawing Sheets

TRIGGER FOR ACTUATING A BAIL ASSEMBLY

CROSS REFERENCE

This application is a division of application Ser. No. 09/189,684 filed Nov. 10, 1998, entitled "Fishing Reel with Trigger Actuated Bail Assembly", now issued U.S. Pat. No. 6,056,221.

BACKGROUND OF THE INVENTION

1. Field of the Invention

This invention relates to fishing reels and, more particularly, to a fishing reel having a bail assembly that is selectively movable from a retrieve position into a cast position through the operation of a trigger.

2. Background Art

One well known fishing reel construction utilizes a rotor with a bail assembly thereon. The bail assembly is repositionable between a cast position and a retrieve position. In the retrieve position for the bail assembly, rotation of the rotor causes the bail assembly to wrap line around a line carrying spool. By repositioning the bail assembly from the retrieve position into the cast position, line can pay freely off of the spool.

Several variations of this type of reel exist which permit repositioning of the bail assembly in different manners. In the simplest form for this system, the user is required to manually grasp, and effect pivoting of, the bail assembly to move the bail assembly from the retrieve position into the cast position.

To avoid having to directly engage the bail assembly, triggers have been incorporated into certain of these reels. In one form, the trigger is mounted on the rotor to follow movement thereof. With this type of trigger, the rotor is repositioned strategically to situate the trigger directly under the rod to allow the user to, with one hand, grasp the fishing rod and reposition the trigger. As the trigger is moved from its normal position to its actuated position, the finger or fingers that actuate the trigger draw the line away from a line roller so that the line is held by the finger/fingers and thereby prevented from paying out as a cast is initiated. The user then thrusts the rod in the desired direction and at the same time releases the line to perform the cast.

In another form, a trigger is mounted to the reel frame so that the rotor rotates relative to the trigger. The assignee herein offers a line of reels of this type which it identifies as its HYPERCAST® fishing reels. The HYPERCAST® fishing reels are designed so that the trigger can reposition the bail assembly regardless of the rotational position of the rotor. The structure of one form of the HYPERCAST® fishing reel is shown in U.S. Pat. No. 5,620,149.

The assignee herein also offers another feature on its reels which obviates the need to have the operator touch the line throughout the performance of a cast. The assignee identifies this feature as its SNAPSHOT® line holding mechanism. Reels with this feature utilize a pivotable arm having a pin at a free end remote from the arm pivot location. Operation of the trigger performs both functions of repositioning the bail assembly and repositioning the pin arm. As the trigger is actuated, the bail assembly moves from the retrieve position into the cast position. Upon full actuation, the pin arm is moved so that the pin free end situates adjacent to a wire on the bail assembly to hold the line and prevent payout thereof. The pin arm is spring biased so that, as the trigger is released, the pin arm repositions to move the pin away from the bail wire to allow line to pay out while the bail assembly remains in the cast position. This feature is shown in U.S. Pat. Nos. 4,921,188 and 5,154,369.

The trigger operated bail assemblies in the SNAPSHOT® line holding mechanisms have been offered successfully by the assignee herein for years. With certain of the reels having rotor mounted triggers, the triggers are mounted for pivoting movement around an axis that crosses a pivot axis for the bail assembly. The trigger cams against the pin arm, which in turns cams the bail assembly from the retrieve position towards the cast position.

Typically, the gripping portion of conventional triggers is made from a hard material that may be uncomfortable to the touch. The user may experience discomfort, particularly after repeated operation of thee triggers.

SUMMARY OF THE INVENTION

In one form, the invention is directed to a rotor assembly for a fishing reel, which rotor assembly includes a rotor having a first rotational axis, a bail assembly that is repositionable relative to the rotor between cast and retrieve positions, and a trigger that is movable relative to the rotor around a second axis between normal and actuated positions. The bail assembly is movable from the retrieve position towards the cast position as an incident of the trigger moving from the normal position to the actuated position. The trigger has a forwardly projecting leg. A gripping portion is applied to the forwardly projecting leg to facilitate engagement of the forwardly projecting leg by a user.

In one form, the forwardly projecting leg is made from a first material and the gripping portion is made from a second material that is different than the first material.

The second material may be softer than the first material.

In one form, the second material is a polymer having a durometer of 60–75 shore A.

In one form, the forwardly projecting leg has a free end and the gripping portion surrounds the free end of the forwardly projecting leg.

In one form, there is a projection on one of the forwardly projecting leg and gripping portion and a recess for the projection on the other of the forwardly projecting leg and gripping portion that is complimentary to the projection to interlock the forwardly projecting leg and gripping portion.

The recess may be defined by an elongate slit in the forwardly projecting leg.

A plurality of recesses may be defined by a plurality of elongate slits in the forwardly projecting leg.

In one form, the elongate slit(s) extends fully through the forwardly projecting leg.

The invention is also directed to a trigger for actuating a bail assembly on a fishing reel, which trigger has a mounting force that is attachable to a support for the trigger so as to allow the trigger to move between normal and actuated positions to thereby change a bail assembly between cast and retrieve positions, projecting leg, and a gripping portion applied to the projecting leg to facilitate engagement of the projecting leg by the user and manipulation thereof to change the trigger from the normal position into the actuated position.

The projecting leg may be made from a first material, with the gripping portion made from a second material that is different than the first material.

The second material may be softer than the first material.

The second material may be a polymer having a durometer of 60–75 shore A.

In one form, the projecting leg has a free end and the gripping portion surrounds the free end of the projecting leg.

In one form, there is a projection on one of the projecting leg and gripping portion and a recess for the projection on the other of the projecting leg and gripping portion is complimentary to the projection to interlock the projecting leg and gripping portion.

In one form, the recess is defined by an elongate slit in the projecting leg.

A plurality of recesses may be defined by a plurality of elongate slits in the projecting leg.

In one form, the elongate slit(s) extends fully through the projecting leg.

In one form, the projecting leg has a length and the trigger has a second elongate leg having a length extending transversely to the length of the projecting leg and a third elongate leg having a length extending transversely to the length of the second elongate leg.

In one form, the mounting portion is on the third leg and has a receptacle for a mounting element.

DETAILED DESCRIPTION OF THE DRAWINGS

Figure 1:
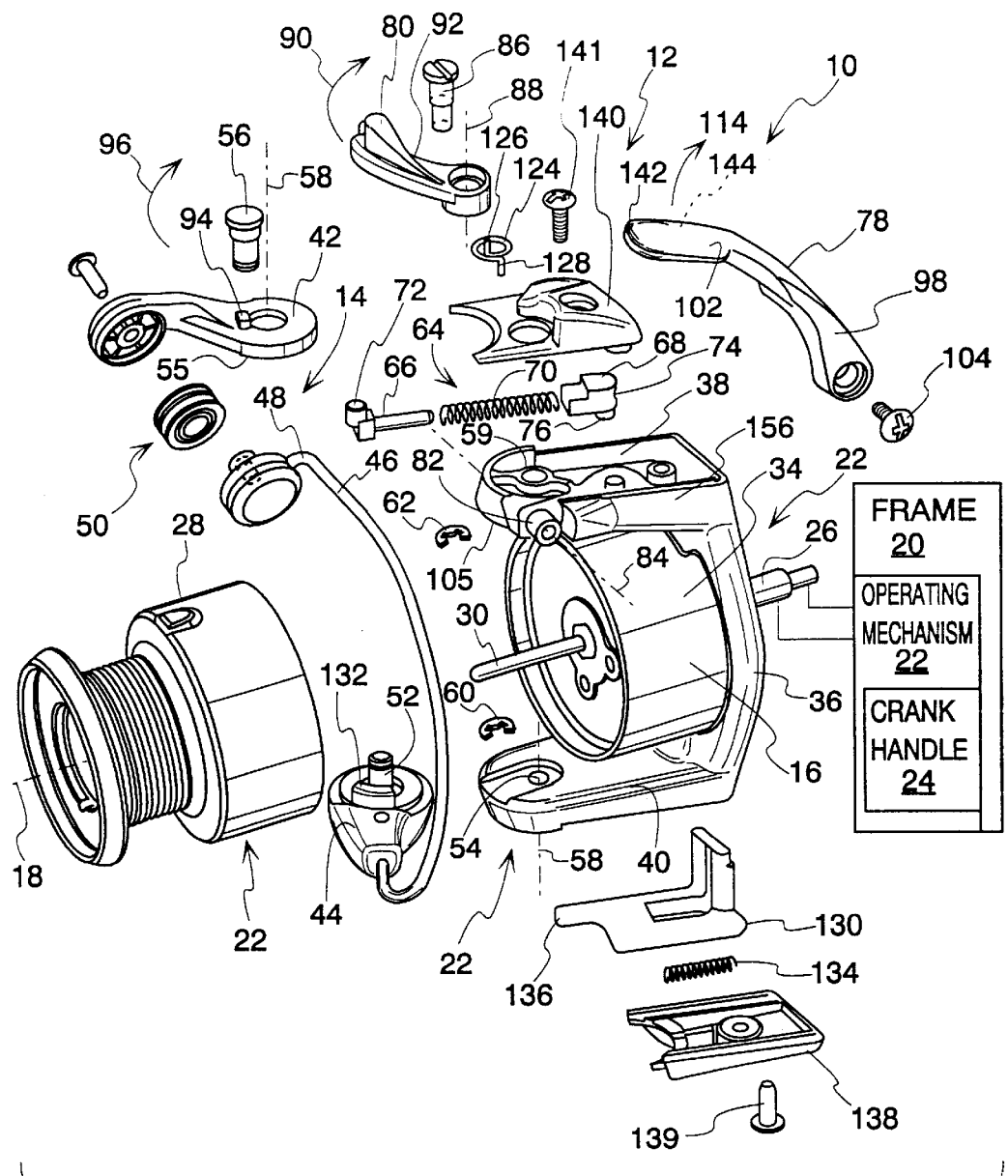
FIG. 1 is a partially schematic, exploded, perspective view of a fishing reel having a rotor assembly according to the present invention incorporated therein.

Referring initially to FIG. 1, a fishing reel is shown at 10 with a rotor assembly at 12, according to the present invention, incorporated therein.

Figure 2:
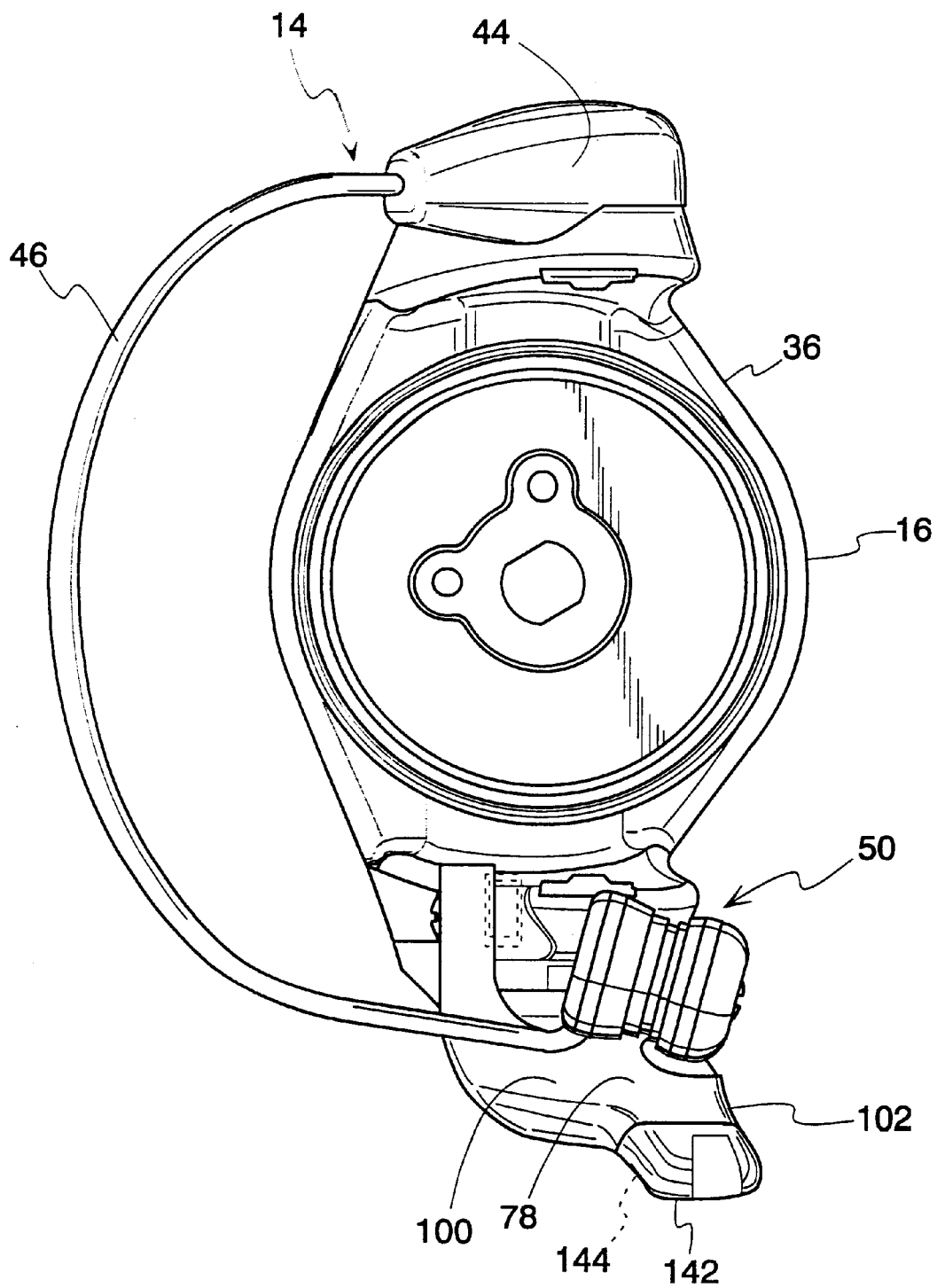
FIG. 2 is a front elevation view of the rotor assembly in FIG. 1 with a trigger on the rotor assembly in a normal position and a bail assembly thereon in a retrieve position.
Figure 3:
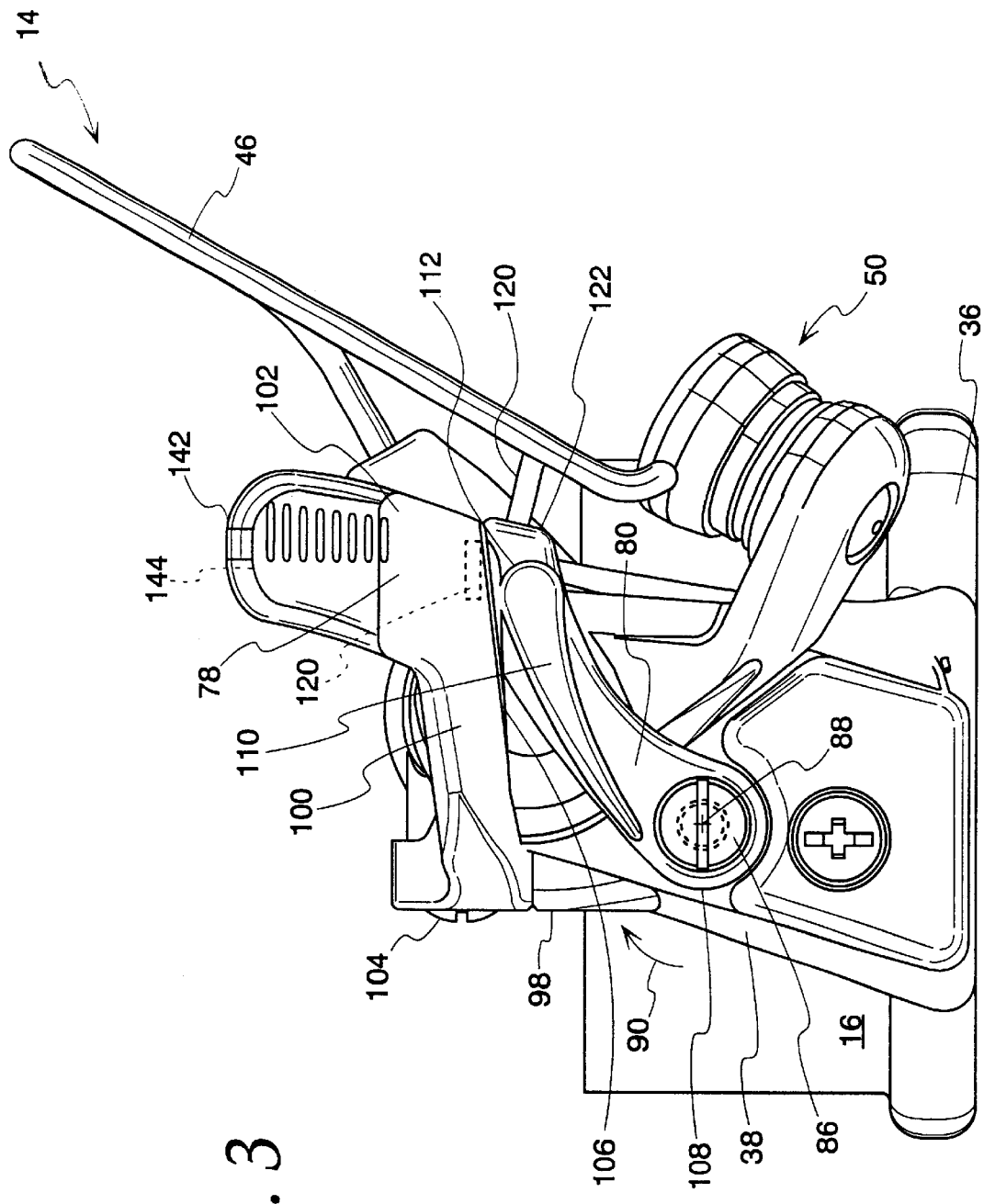
FIG. 3 is a side elevation view of the rotor assembly in FIGS. 1 and 2, with the trigger moved from the normal position of FIG. 2 into an actuated position and the bail assembly moved from the retrieve position of FIG. 2 into the cast position.
Figure 4:
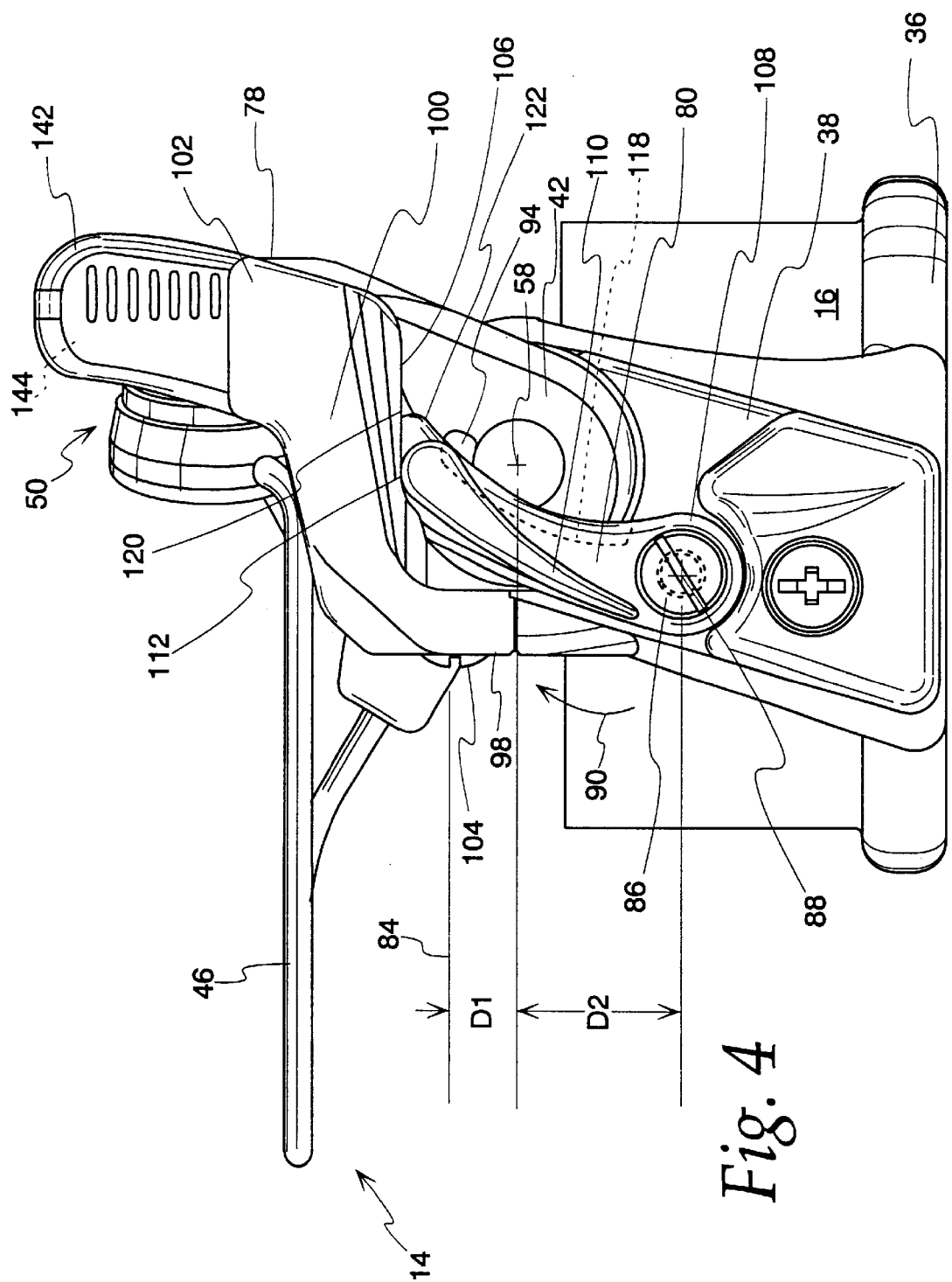
FIG. 4 is a view as in FIG. 3 with the trigger in the normal position and the bail assembly in the retrieve position.
Figure 5:
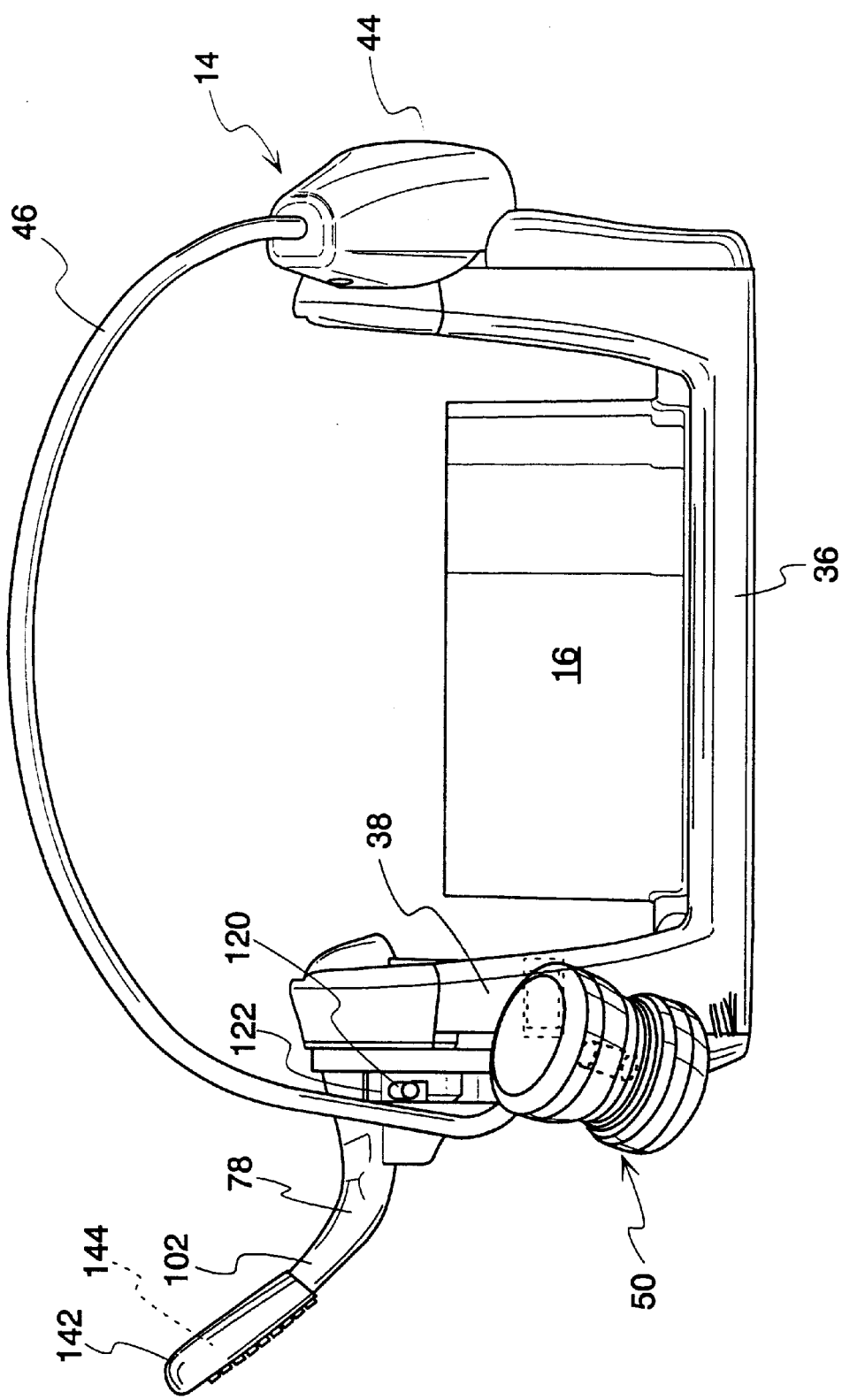
FIG. 5 is a view as in FIG. 3 with the rotor assembly in the state of FIG. 3 and rotated 90° around the central axis of the rotor assembly.

Initially, it should be understood that the invention is concerned principally with the actuation of a bail assembly at 14 which is mounted to a rotor 16 for pivoting movement between a cast position (see FIGS. 3 and 5) and a retrieve position (See FIGS. 2 and 4). There are a myriad of different mechanisms in existence which drive a rotor, such as the rotor 16, about a central axis 18, which extends in a fore and aft direction with respect to the reel 10. As but one example is that shown in U.S. Pat. No. 5,004,182, which is incorporated herein by reference. Since this mechanism is peripheral to the present invention, it will be described only generally herein.

In FIG. 1, a frame 20 provides a support for an operating mechanism 22, of which the rotor 16 forms a part. Through a crank handle 24, rotation is imparted to a shaft 26 to which the rotor 16 is attached. With the bail assembly 14 in the retrieve position, this rotation causes line to be wrapped around a line carrying spool 28.

The line carrying spool 28 is mounted upon a shaft 30 which extends through the rotor 16 and pinion gear, having a forward extension shown partially at 26, to an oscillating mechanism (not shown) that is part of the operating mechanism 22. Through the oscillating mechanism, the shaft 30, and line carrying spool 28 thereon, are reciprocated along the axis 18 to cause an even distribution of line upon the spool 28.

The details of the rotor assembly 12 will now be described. The rotor 16 consists of a cylindrical body 34 which blends into a wall 36 at the rear of the body 34. Diametrically opposite, first and second bail ears 38, 40 project forwardly from the wall 36 and generally parallel to the axis 18 so that a slight gap is maintained between the bail ears 38, 40 and the body 34.

The bail assembly 14 consists of first and second arms 42, 44 with a bail wire 46 connected therebetween. At one end 48 of the bail wire 46, a line roller assembly 50 is provided at the point of connection of the bail wire 46 with the bail arm 42 to function in conventional fashion.

The bail arm 44 has a mounting post 52 which extends radially inwardly through a bore 54 through the bail ear 40. The arm 42 has a substantially flat surface 55 facing radially inwardly with respect to the first axis 18 and is mounted to the other bail ear 38 through a pin 56 whereby the mounting post 52 and pin 56 guide pivoting of the bail assembly 14 as a unit around a second axis 58 relative to the rotor 20. The bail ear 38 has a substantially flat surface 59 directly exposed to and facing the bail arm surface 55. The surfaces 55, 59 are guided relative to each other around the second axis 58 as the bail assembly 14 repositions. The mounting post 52 and pin 56 are held in place by conventional clips 60, 62, respectively.

Through an overcenter bias mechanism at 64, the bail assembly 14 is pivotably driven into each of the cast and retrieve positions. The overcenter bias mechanism 64 has a conventional construction. Briefly, the overcenter bias mechanism 64 consists of a shaft element 66, a shaft receiver element 68, and a coil spring 70. The shaft element 66 has a post 72 which is pivotably mounted to the bail arm 42 at a location offset from the second axis 58. The shaft element 66 projects through the spring 70 and a bore 74 through the shaft receiver element 68. The shaft receiver element 68 has a post 76 which is directed into the ear 38 for rotation around an axis that is parallel to, and spaced from, the rotational axis of the post 72.

The posts 72, 76 are relatively positioned so that with the bail assembly 14 moved toward the retrieve position, the spring 70 acts between the shaft element 66 and shaft receiver element 68 so as to exert a torque on the bail assembly 14, driving the bail assembly 14 fully into the retrieve position. Once the bail assembly 14 is moved from the retrieve position towards the cast position to beyond an overcenter position, the spring 70 acts between the shaft element 66 and shaft receiver element 68 to drive the bail assembly 14 fully into the cast position.

Figure 6:
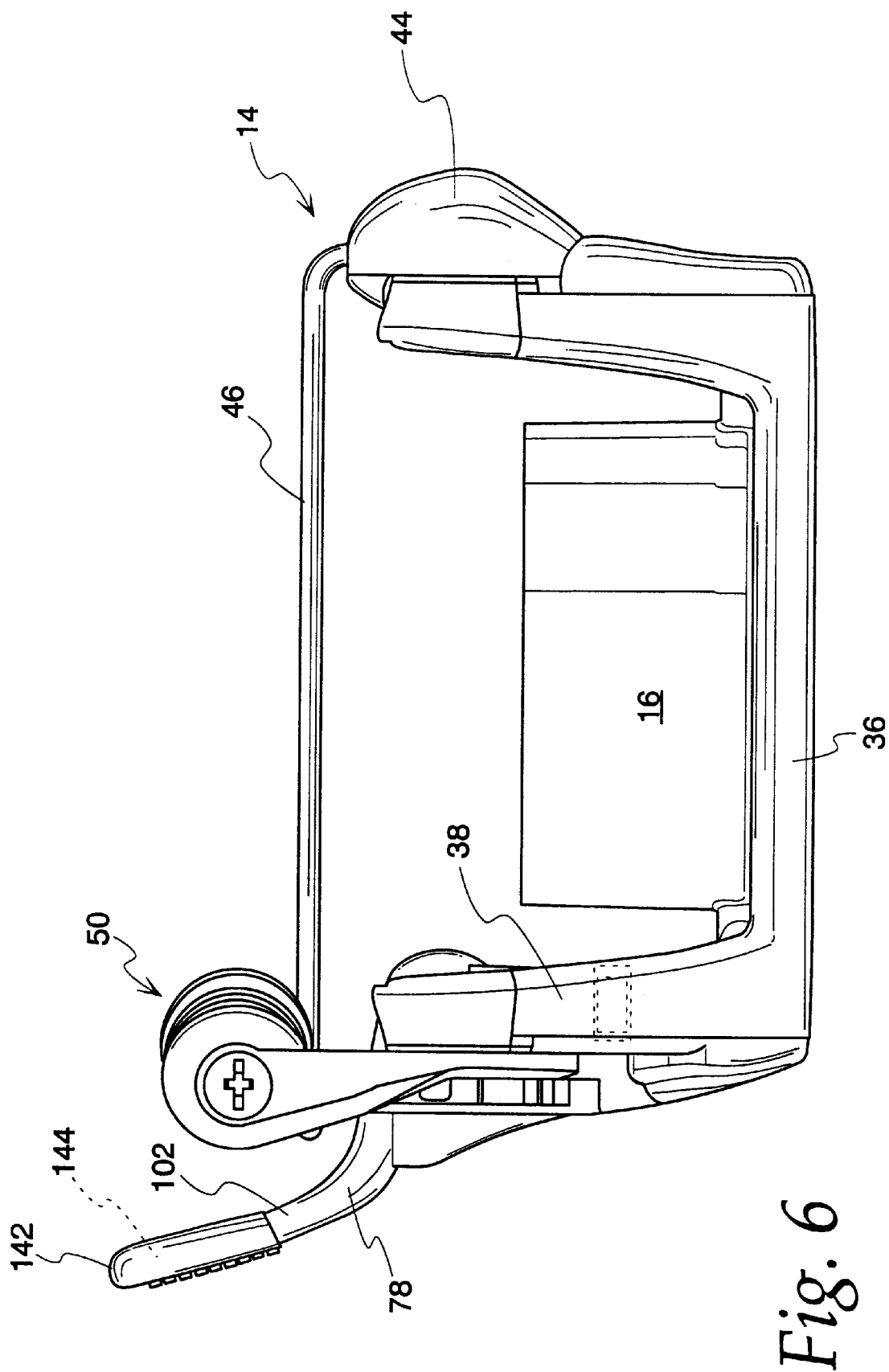
FIG. 6 is a view as in FIG. 5 with the rotor assembly in the state shown in FIG. 4.

The bail assembly 14 is repositionable from the retrieve position into the cast position by the cooperative arrangement of a trigger 78, a pin arm 80, and the bail arm 42. The trigger 78 is mounted to a post 82 on the bail ear 38 for pivoting movement around a third axis 84 between a normal position, shown in FIGS. 2, 4 and 6, and an actuated position, shown in FIGS. 3 and 5. The pin arm 80, with which the trigger 78 cooperates, is mounted to the ear 38 through a pin 86 for rotation about a fourth axis 88 relative to the rotor 20.

With the bail assembly 14 in the retrieve position, pivoting of the trigger 78 from the normal position into the actuated position causes the trigger 78 to contact the pin arm 80 and urge the pin arm 80 pivotably around the axis 88 in the direction of the arrow 90. In so doing, an edge 92 on the pin arm 80 bears against a post 94 on the arm 42. The post 94 is offset from the axis 58 so that the action of the edge 92 on the post 94 pivots the arm 42 in the direction of the arrow 96 around the axis 58, which moves the bail assembly 14 from the retrieve position to beyond the overcenter position between the cast and retrieve positions, whereupon the overcenter bias mechanism 64 drives the bail assembly 14 fully into the cast position.

Referring now also to FIGS. 2–7, the structure of the trigger 78, pin arm 80, and cooperation therebetween and with the bail assembly 14 are more clearly shown. The trigger 78 has a first elongate leg 98 with a length extending substantially radially with respect to the first axis 18. The trigger 78 has a second elongate leg 100 with a length extending substantially circumferentially relative to the rotor i.e. in a direction around the first axis 18 and generally parallel to the third axis 84. The trigger 78 has a forwardly projecting third elongate leg 102 with a length extending substantially parallel to the first axis 18. In the embodiment shown, there is a single piece that defines each of the first, second, and third elongate legs 98, 100, 102.

The first elongate leg 98 of the trigger 78 is attached to the post 82 on the bail ear 38 through a screw 104. The post 82 is located adjacent to the forward end 105 of the bail ear 38, which forward end 105 defines the forwardmost extension of the rotor 20. The second elongate leg 100 has a substantially straight edge 106 extending in a line that is substantially parallel to the third axis 84.

The pin arm 80 has a slightly curved shape with a thickened mounting portion 108 through which the pin 86 extends. The pin arm 80 has a ramp-shaped portion 110 which increases in radial projection relative to the first axis 18 moving forwardly of the pin arm 80 from the mounting portion 108. The ramp-shaped portion 110 of the pin arm 80 terminates in a curved forward edge 112 which is situated to abut to the straight edge 106 on the trigger 78. As the trigger 78 is pivoted in the direction of the arrow 114 (FIG. 1) from the normal position into the actuated position around the axis 84, the straight edge 106 on the trigger 78 moves rearwardly and bears against the curved edge 112 on the ramp-shaped portion 110 of the pin arm 80. Continued pivoting of the trigger 78 causes the straight edge 106 to progressively cam the pin arm 80 in the direction of the arrow 90 from a first position, as shown in FIG. 4, into a second position, as shown in FIG. 3.

The pin arm 80 has an undercut defining an actuating edge 118 which engages the post 94 on the bail arm 42. The post 94 is offset relative to the axis 58 so that pivoting movement of the pin arm 80 from the first position into the second position drives the bail arm 42, through the post 94, from the retrieve position towards the cast position and beyond the overcenter position for the bail assembly 14, whereupon the overcenter bias mechanism 64 drives the bail assembly 14 fully into the cast position.

By reason of pivoting the trigger 78 on the bail ear 38 and configuring the trigger 78 as shown, the trigger 78 does not have to be stacked radially outwardly on the bail arm 42 relative to the first axis 18. Preferably, the third axis 84 is radially inside the surface 59 relative to the first axis 18. This permits a relatively low profile trigger 78 to be used.

The relationship between the axes 18, 58, 84, 88 facilitates bail assembly actuation. The third axis 84 for the trigger 78 is situated forwardly of the bail arm axis 58 and pin arm axis 88. A positive torque can be produced on the bail assembly 14 through the trigger 78 without excessive force application on the trigger 78 by the user or movement of the trigger 78 through an unacceptably large pivot range.

The pin arm 80 has a pin 120 embedded therein to project in cantilever fashion from the free end 122 of the pin arm 80. The pin 120 moves as one piece with the pin arm 80. With the bail assembly 14 in the cast position and the pin arm 80 in the second position, the pin 120 assumes a first relationship with the bail wire 46 adjacent thereto (See phantom line location in FIG. 3) wherein line on the line carrying spool 28 is allowed to freely pay off in an unwrapping motion around the axis 18. By repositioning the pin arm 80 to the second position, shown in solid lines in FIG. 3, with the bail assembly 14 in the cast position, the pin 120 assumes a second relationship with the bail wire 46. In this state, line extending away from the line carrying spool 28 is wrapped around the pin 120 and prohibited from paying off of the spool 28 by an unwrapping motion around the axis 18.

With the bail assembly 14 in the retrieve position, the pin arm 80 is urged by a torsion spring 124 into the first position. The spring 124 has a circular shape with offset ends 126, 128 which project into the pin arm 80 and bail ear 38, respectively. The spring 124 is loaded so that the pin arm 80 is normally biased into the first position. The bias produced on the pin arm 80 also causes the curved edge 112 of the pin arm 80 to engage and pivot the trigger 78 into the normal position therefor.

The sequence of operation of the trigger 78, pin arm 80, and bail assembly 14 will now be described starting with the rotor assembly 12 in the FIG. 4 state, i.e. with the bail assembly 14 in the retrieve position and the trigger 78 in the normal position. By moving the trigger 78 in the direction of the arrow 114, the edge 106 on the trigger 78 cams the pin arm 80, exerting a rearward force on the curved edge 112 of the pin arm 80 to effect movement of the pin arm 80 towards the second position. As this occurs, the pin arm edge 118 drives the post 94 on the bail arm 42 to move the bail assembly 14 beyond the overcenter position therefor, whereupon the overcenter bias mechanism 64 drives the bail assembly 14 into the cast position. With the trigger 78 maintained in the actuated position, the pin arm 80 is maintained in the second position and in turn the pin 120 is maintained in the aforementioned second relationship with the bail wire 46. Line is thus prevented from paying off of the line carrying spool 28. The user, maintaining this state, thrusts the reel and rod in the desired direction and at the same time releases the trigger 78. With the bail assembly 14 in the cast position, and the trigger 78 released, the spring 124 drives the pin arm 80 back to the first position. As this occurs, the curved edge 112 on the pin arm 80 acts against the trigger edge 106 to urge the trigger 78 back to the normal position.

By then rotating the rotor 20 through the crank handle 24, the bail assembly 14 is caused to be automatically returned to the retrieve position. As seen in FIG. 1, this is accomplished through a trip link 130 which is driven rearwardly from a retracted position by a post 132 on the bail arm 44 as the bail assembly 14 moves from the retrieve position to the cast position. The trip link 130 is moved to an extended position against the force produced by a coil spring 134 loaded thereagainst. As the rotor 20 is rotated with the bail assembly 14 in the cast position, the trip link 130 in the extended position acts against a part of the frame 20 and is thereby cammed forwardly so that a forward edge 136 on the trip link 130 acts against the post 132 on the bail arm 44 to urge the bail assembly from the cast position into the retrieve position.

A removable cover 138 is provided on the bail ear 40 to captively maintain the trip link 130 in place and to permit access thereto. A similar, removable cover 140 is provided on the bail ear 38 to captively confine the overcenter bias mechanism 64.

To facilitate manipulation of the trigger 78, a gripping portion 142 is provided on the third elongate leg 102. The gripping portion 142 is defined by a material which is preferably different than the material which defines the third elongate leg 102. The third elongate leg 102 is made from a material that can withstand the operating forces exerted thereon and may be, for example, metal, plastic, or a composite. The gripping portion 142 is preferably made from a material that is comfortable to the touch. Preferably, the material making up the gripping portion 142 is softer than the material defining the third elongate leg 102. A polymer having a durometer of 60–75 Shore A is suitable for this purpose. The polymer may be pre-formed to be pressed onto a free end 144 of the leg 102 to surround the free end 144. Alternatively, the gripping portion 142 can be molded in place around the third elongate leg 102.

In the embodiment shown, the third elongate trigger leg 102 has a reduced cross-sectional area taken transversely to the length of the leg 102, whereby a forwardly facing, annular shoulder 145 is defined around the trigger leg 102. A reduced dimension portion at 146 results that supports the gripping portion 142. The portion 146 has by oppositely facing, substantially flat surfaces 147, 148 to which the polymer is directly applied. Rows of recesses/slits 149 are defined partially, and more preferably fully, through the reduced diameter trigger portion 146 between the surfaces 147, 148. Molding of the polymer over the trigger portion 146 causes the polymer to flow into the slits 149 to form projections in the slits 149 that lock the gripping portion 142 in place. Rearward shifting of the gripping portion is further resisted by the annular shoulder 145.

Figure 7:
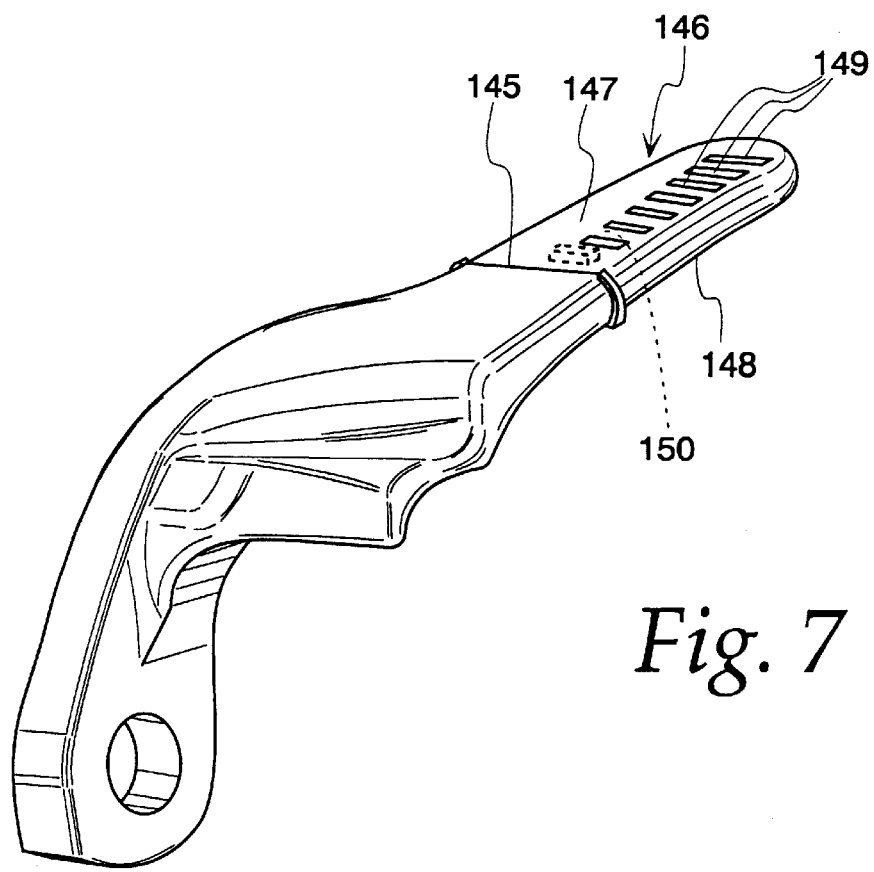
FIG. 7 is an enlarged, perspective view of the trigger with a gripping portion removed therefrom.

Alternatively, one or more projections 150, as shown in dotted lines in FIG. 7 can be used instead of the slits 149, or in conjunction with the slits 149. The polymer flows around the projection(s) 150, thereby causing an interlocking once the polymer cures and a recess complementary to the projection 150 is fixed therein.

The above arrangement provides good mechanical advantage. At the same time, this arrangement permits a relatively low profile trigger construction which allows a substantial finger space to be maintained between the rod upon which the reel 10 is mounted and the trigger 78. Further, with a relatively low profile trigger 78, centrifugal forces that require balancing may be limited.

Figure 8:
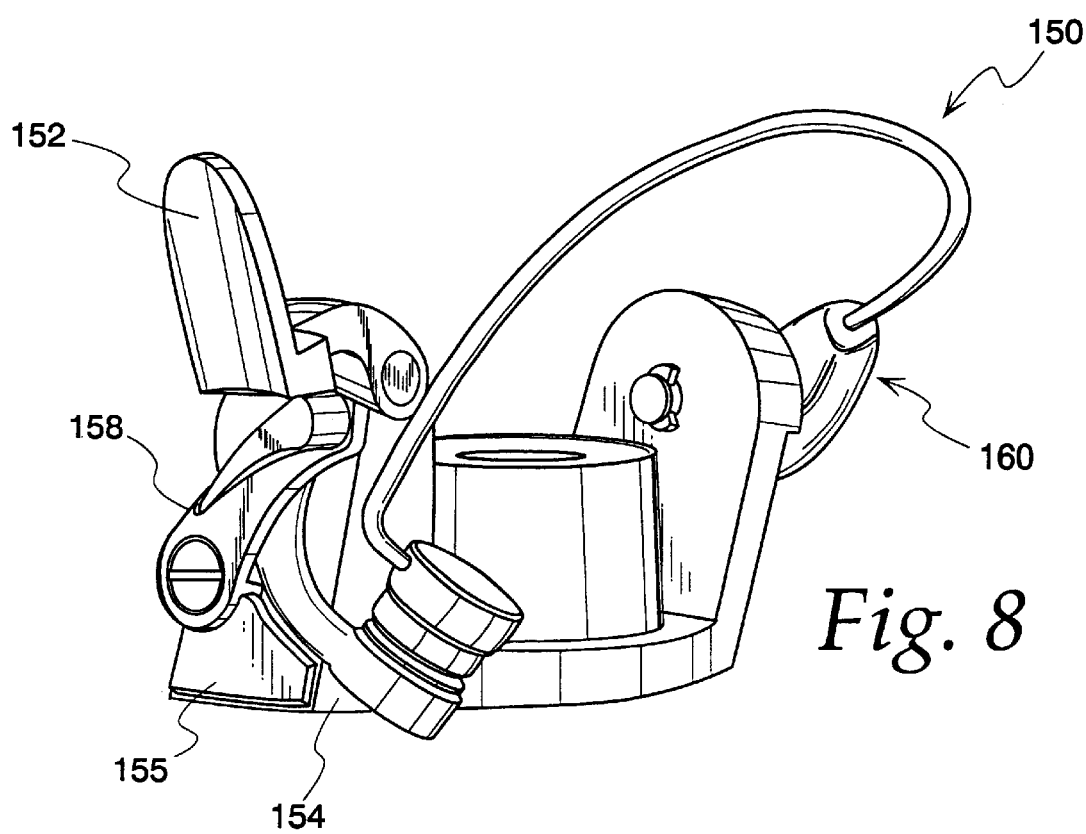
FIG. 8 is a perspective view of a modified form of rotor assembly with a trigger on the rotor assembly in an actuated position and a bail assembly on the rotor assembly in a cast position.
Figure 9:
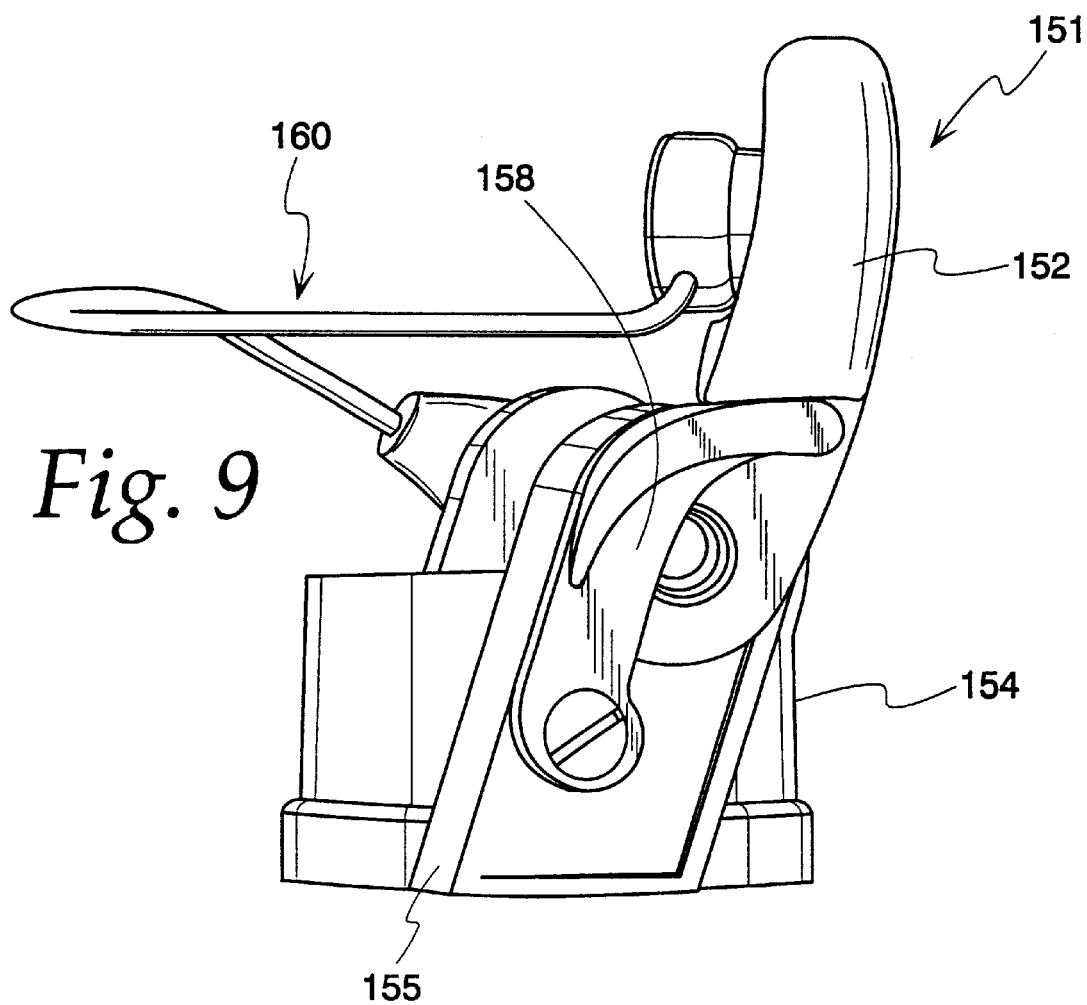
FIG. 9 is a perspective view of the rotor in FIG. 8 with the trigger in a normal position and the bail assembly in a retrieve position.

In FIGS. 8 and 9, a modified form of rotor assembly, according to the present invention, is shown at 150. The rotor assembly 150 differs from the rotor assembly 12 in that a trigger 152, corresponding to the trigger 78, is mounted at a circumferentially spacing edge 154 on a rotor ear 155 that is opposite to the corresponding edge 156 (FIG. 1) on the rotor ear 38. The trigger 152 operates and cooperates with a pin arm 158 and bail assembly 160, corresponding to the pin arm 80 and bail assembly 14, in the same manner as described with respect to the reel 10.

The foregoing disclosure of specific embodiments is intended to be illustrative of the broad concepts comprehended by the invention.

What is claimed is:

1. A rotor assembly for a fishing reel, said rotor assembly comprising:

a rotor having a first rotational axis, the rotor having forward and rear ends spaced axially relative to the first axis;

a bail assembly that is repositionable relative to the rotor between cast and retrieve positions, and a trigger that is movable relative to the rotor around a second axis between normal and actuated positions, the bail assembly being movable from the retrieve position towards the cast position as an incident of the trigger moving from the normal position to the actuated position, wherein the trigger has a forwardly projecting leg and there is a gripping portion applied to the forwardly projecting leg to facilitate engagement of the forwardly projecting leg by a user.

2. The rotor assembly for a fishing reel according to claim 1 wherein the forwardly projecting leg is made from a first material and the gripping portion is made from a second material that is different than the first material.

3. The rotor assembly for a fishing reel according to claim 2 wherein the second material is softer than the first material.

4. The rotor assembly for a fishing reel according to claim 3 wherein the second material is a polymer having a durometer of 60–75 Shore A.

5. The rotor assembly for a fishing reel according to claim 3 wherein the forwardly projecting leg has a free end and the gripping portion surrounds the free end of the forwardly projecting leg.

6. The rotor assembly for a fishing reel according to claim 3 wherein there is a projection on one of the forwardly projecting leg and gripping portion and a recess for the projection on the other of the forwardly projecting leg and gripping portion that is complementary to the projection to interlock the forwardly projecting leg and gripping portion.

7. The rotor assembly for a fishing reel according to claim 6 wherein the recess is defined by an elongate slit in the forwardly projecting leg.

8. The rotor assembly for a fishing reel according to claim 6 wherein there are a plurality of recesses defined by a plurality of elongate slits in the forwardly projecting leg.

9. The rotor assembly for a fishing reel according to claim 7 wherein the elongate slit extends fully through the forwardly projecting leg.

10. A trigger for actuating a bail assembly on a fishing reel, said trigger comprising:

a mounting portion that is attachable to a support for the trigger so as to allow the trigger to move between normal and actuated positions, to thereby change a bail assembly between cast and retrieve positions;

a projecting leg; and a gripping portion applied to the projecting leg to facilitate engagement of the projecting leg by a user and manipulation thereof to change the trigger from the normal position into the actuated position.

11. The trigger according to claim 10 wherein the projecting leg is made from a first material and the gripping portion is made from a second material that is different than the first material.

12. The trigger according to claim 11 wherein the second material is softer than the first material.

13. The trigger according to claim 12 wherein the second material is a polymer having a durometer of 60–75 Shore A.

14. The trigger according to claim 12 wherein the projecting leg has a free end and the gripping portion surrounds the free end of the projecting leg.

15. The trigger according to claim 12 wherein there is a projection on one of the projecting leg and gripping portion and a recess for the projection on the other of the projecting leg and gripping portion that is complementary to the projection to interlock the projecting leg and gripping portion.

16. The trigger according to claim 15 wherein the recess is defined by an elongate slit in the projecting leg.

17. The trigger according to claim 15 wherein there are a plurality of recesses defined by a plurality of elongate slits in the projecting leg.

18. The trigger according to claim 15 wherein the elongate slit extends fully through the projecting leg.

19. The trigger according to claim 10 wherein the projecting leg has a length and the trigger comprises a second elongate leg having a length extending transversely to the length of the projecting leg and a third elongate leg having a length extending transversely to the length of the second elongate leg.

20. The trigger according to claim 19 wherein the mounting portion is on the third leg and comprises a receptacle for a mounting element.

* * * * *